(12) United States Patent
Crocker et al.

(10) Patent No.: US 7,204,264 B2
(45) Date of Patent: Apr. 17, 2007

(54) HIGH PRESSURE CAPILLARY MICRO-FLUIDIC VALVE DEVICE AND A METHOD OF FABRICATING SAME

(75) Inventors: Robert W. Crocker, Fremont, CA (US); Pamela F. Caton, Berkely, CA (US); Geoff C. Gerhardt, Milbury, MA (US)

(73) Assignee: Waters Investments Ltd., New Castle, DE (US)

( * ) Notice: Subject to any disclaimer, the term of this patent is extended or adjusted under 35 U.S.C. 154(b) by 163 days.

(21) Appl. No.: 10/941,216

(22) Filed: Sep. 15, 2004

(65) Prior Publication Data

US 2005/0236055 A1   Oct. 27, 2005

Related U.S. Application Data

(60) Provisional application No. 60/564,256, filed on Apr. 21, 2004.

(51) Int. Cl.
*F15C 1/04* (2006.01)
(52) U.S. Cl. .................. 137/15; 137/74; 137/251.1; 137/828
(58) Field of Classification Search ........... 137/15, 137/828, 251.1, 74
See application file for complete search history.

(56) References Cited

U.S. PATENT DOCUMENTS

| | | | |
|---|---|---|---|
| 3,663,203 A | 5/1972 | Davis et al. | ...... 75/43 |
| 3,688,501 A | 9/1972 | Ellis, Jr. | ...... 60/54.6 |
| 3,789,190 A | 1/1974 | Orosy et al. | ...... 219/497 |
| 3,917,531 A | 11/1975 | Magnussen | ...... 210/101 |
| 3,932,067 A | 1/1976 | Ball et al. | ...... 417/339 |
| 3,975,946 A | 8/1976 | Ball et al. | ...... 73/61.1 |
| 4,003,243 A | 1/1977 | Blu et al. | ...... 73/61.1 |
| 4,174,772 A | 11/1979 | Neuss et al. | ...... 435/32 |

(Continued)

FOREIGN PATENT DOCUMENTS

DE   199 14 358   10/2000

(Continued)

OTHER PUBLICATIONS

MacNair, et al., "Ultrahigh-Pressure Reversed-Phase Liquid Chromatography in Packed Capillary Columns," Analytical Chemistry, 1997, 69(6), 983-989.

(Continued)

*Primary Examiner*—A. Michael Chambers
(74) *Attorney, Agent, or Firm*—Brian L. Michaelis; Brown Rudnick Berlack Israels LLP

(57) ABSTRACT

A freeze-thaw valve and a method of micro-machining the freeze-thaw valve is provided and includes a valve housing, wherein the valve housing defines a housing cavity and includes a housing inlet, a housing vent, a capillary tubing inlet and a capillary tubing outlet. A valve body is provided, at least a portion of which is lithographically constructed, wherein the valve body includes a refrigerant inlet, a refrigerant outlet and an expansion chamber. The expansion chamber is disposed to communicate the refrigerant inlet with the refrigerant outlet and includes a restriction region having a flow restriction. Additionally, the valve body is disposed within the housing cavity to form an insulating channel between the valve housing and the valve body.

29 Claims, 17 Drawing Sheets

U.S. PATENT DOCUMENTS

| | | | | |
|---|---|---|---|---|
| 4,203,472 | A | 5/1980 | Dulaney | 137/828 |
| 4,258,740 | A | 3/1981 | Kaartinen et al. | 137/74 |
| 4,505,115 | A | 3/1985 | Arbuckle | 60/562 |
| 4,612,959 | A | 9/1986 | Costello | 137/828 |
| 4,684,465 | A | 8/1987 | Leaseburge et al. | 210/198.2 |
| 4,766,922 | A | 8/1988 | Kaartinen et al. | 137/13 |
| 4,840,730 | A | 6/1989 | Saxena | 210/198.2 |
| 4,883,409 | A | 11/1989 | Strohmeier et al. | 417/43 |
| 4,949,742 | A | 8/1990 | Rando et al. | 137/13 |
| 4,989,626 | A | 2/1991 | Takagi et al. | 137/13 |
| 5,004,538 | A | 4/1991 | Apfel | 210/198.2 |
| 5,014,738 | A | 5/1991 | Jones | 137/340 |
| 5,035,138 | A | 7/1991 | Abdel-Rahman | 73/204.15 |
| 5,092,745 | A | 3/1992 | Graham | 417/401 |
| 5,101,848 | A | 4/1992 | Kojima et al. | 137/13 |
| 5,234,586 | A | 8/1993 | Afeyan et al. | 210/198.2 |
| 5,306,426 | A | 4/1994 | Afeyan | 210/635 |
| 5,311,896 | A | 5/1994 | Kaartinen | 137/15 |
| 5,316,262 | A | 5/1994 | Koebler | 251/8 |
| 5,346,622 | A | 9/1994 | Klee et al. | 210/198.2 |
| 5,491,096 | A | 2/1996 | Sportsman | 436/518 |
| 5,563,352 | A | 10/1996 | Helmig | 73/863.12 |
| 5,614,089 | A | 3/1997 | Allington et al. | 210/198.2 |
| 5,630,706 | A | 5/1997 | Yang | 417/3 |
| 5,637,790 | A | 6/1997 | de Corral | 73/54.06 |
| 5,778,760 | A | 7/1998 | Yuda | 92/151 |
| 5,795,788 | A | 8/1998 | Bevan et al. | 436/161 |
| 5,938,932 | A | 8/1999 | Connelly et al. | 210/659 |
| 5,954,954 | A | 9/1999 | Houck et al. | 210/198.2 |
| 5,988,197 | A | 11/1999 | Colin et al. | 137/13 |
| 6,007,302 | A | 12/1999 | Welle | 417/52 |
| 6,036,923 | A | 3/2000 | Laugharn, Jr. et al. | 422/82.13 |
| 6,041,811 | A | 3/2000 | Walter et al. | 137/334 |
| 6,159,744 | A | 12/2000 | Bevan et al. | 436/180 |
| 6,311,713 | B1 | 11/2001 | Kaartinen | 137/13 |
| 6,342,184 | B1 | 1/2002 | Bevan et al. | 422/70 |
| 6,386,050 | B1 | 5/2002 | Yin et al. | 73/861.95 |
| 6,460,420 | B1 | 10/2002 | Paul et al. | 73/861.52 |
| 6,557,575 | B1 | 5/2003 | Gerhardt et al. | 137/13 |
| 6,627,075 | B1 | 9/2003 | Weissgerber et al. | 210/198.2 |
| 6,637,263 | B2 | 10/2003 | Zimmermann et al. | 73/195 |
| 6,712,587 | B2 | 3/2004 | Gerhardt et al. | 417/390 |
| 6,752,922 | B2 | 6/2004 | Huang et al. | 210/198.2 |
| 6,813,944 | B2 | 11/2004 | Mayer et al. | 73/204.26 |
| 7,004,184 | B2 * | 2/2006 | Handique et al. | 137/1 |
| 2002/0146349 | A1 | 10/2002 | Gygi et al. | 422/70 |

FOREIGN PATENT DOCUMENTS

| | | |
|---|---|---|
| EP | 1 248 096 | 9/2003 |
| FR | 2422884 | 9/1979 |

OTHER PUBLICATIONS

MacNair, et al., "Ultrahigh-Pressure Reversed-Phase Capillary Liquid Chromatography: Isocratic and Gradient Elution Using Columns Packed with 1.0- μm Particles," Analytical Chemistry, 1999, 71(3), 700-708.

LeBlanc, "The Stableflow pump—A low-noise and drift-free pump for high performance liquid chromatography", Rev.Sci.Instrum., 1991, 62(6), 1642-1646.

μ-FLOW Series L01 Mass Flow Meters, available from Bronkhorst, RUURLO, The Netherlands, Product Summary, 2 pgs.

Liquid Mass Flow Meter SLG1430, available from Sensirion, Switzerland, Product Summary, 9 pgs.

Bevan, et al., "Freeze-Thaw Flow Management: A Novel Concept for High-Performance Liquid chromatography, Capillary Electrophoresis, Electrochromatography and Associated Techniques", Journal of Chromatography, 697 (1995), 541-548.

Zhang, et al., "Automated and Integrated System for High-Throughput DNA Genotyping Directly from Blood", Analytical Chemistry, 71(6), 1999, 1138-1145.

Bevan, "A Lab in Lilliput: A Dream Or Reality", Royal Society of Chemistry/Chromatographic Society "miniaturization in Analytical Chemistry", Meeting at the Linnean Society, London, Mar. 14, 2000, 13 pgs.

Lötters, "Economical Thermal Mass Flow Sensor Based on Constant Temperature Anemometry", Sensor 99, May 18-20, 1999, Nürnberg, Germany, 6 pgs.

Lötters, "Thermal Liquid Mass Flow Controller with Fast Response and Easy Rangeability", Sensor 01, May 8-10, 2001, Nürnberg, Germany, 6 pgs.

* cited by examiner

| Device | Material | Diffusivity [mm²/sec] | Density [gm/cm³] | Thermal Conductivity [W/m-K] | Heat Capacity [J/Kg-k] | Time Const. [sec] | Heat Load [J] | CO₂ pulse [mg] |
|---|---|---|---|---|---|---|---|---|
| Micro Device 4 x 4 x 2.5 mm | Cu | 90 | 8.93 | 401 | 385 | 0.069 | 9.0 | 53.1 |
| | Ag | 174 | 10.5 | 429 | 235 | 0.036 | 6.5 | 38.1 |
| | SiO₂ | 0.834 | 2.22 | 1.38 | 745 | 7.5 | 4.3 | 25.5 |
| | Si | 89 | 2.33 | 148 | 712 | 0.070 | 4.4 | 25.6 |
| Macro Device 2 gm, 10 mm | Cu | 90 | 8.93 | 401 | 385 | 1.1 | 53.9 | 317.1 |

Figure 13

HIGH PRESSURE CAPILLARY MICRO-FLUIDIC VALVE DEVICE AND A METHOD OF FABRICATING SAME

CROSS REFERENCED TO RELATED APPLICATIONS

This application claims priority from U.S. Provisional Patent Application Ser. No. 60/564,256, filed on Apr. 21, 2004 the contents of which are incorporated herein by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. DE-AC04-94AL85000 awarded by the U.S. Department of Energy.

FIELD OF THE INVENTION

This invention relates generally to an apparatus for controlling a liquid flow through tubing and channels and more particularly to an apparatus for controlling a liquid flow through micro-scale capillary tubing and channels by freezing and thawing the liquid within a segment of the tube or channel.

BACKGROUND OF THE INVENTION

The freezing and thawing of a liquid flowing within nano-scale capillaries and channels to act as an on/off switch or valve is known in the art, see for example U.S. Pat. Nos. 6,342,184, 6,159,744, 6,007,302 and 5,795,788. This technique uses a flow-switching device, commonly referred to as a "freeze-thaw valve," to stop or divert liquid flow to a further channel or chamber simply by freezing and thawing the liquid contained within a segment of channel or tubing. This freeze-thaw valve, which allows for the management and control of liquid flowing within channels having a small diameter, does not require any moving parts and does not contribute any unswept dead volume within an analytical system.

Freeze-thaw valves typically comprise a valve body suspended in an insulating housing, wherein the valve body includes an enclosed thermally conductive expansion chamber having a porous metal vent. Flow capillaries are inserted into through-holes in the valve body, where they make intimate thermal contact with the valve body. An electrical resistance heater and thermocouple are attached to the valve body to supply heat to thaw the frozen fluid plug and thus open the valve. These freeze-thaw valves typically operate by projecting a jet of cold gas, such as liquid carbon dioxide and/or liquid nitrogen from a liquefied source of gas under pressure, directly onto a segment of channel or tubing. This causes the liquid flowing within the segment of channel or tubing to freeze, creating a plug of frozen liquid, which blocks the flow of liquid through the valve, i.e. the valve is "closed". The electrical resistance heater can be energized to produce heat that conducts throughout the valve body and warms the frozen fluid plug allowing the liquid to flow through the valve, i.e. the valve is "open". Thermocouples or resistance thermal detectors (RTD) may be used to provide temperature sensing for control of the heating and cooling of the valve body.

Known freeze-thaw valves are fabricated using conventional machining techniques in three-dimensional geometry and as a result these valves have been limited to larger sizes. This is undesirable in many applications because the size of the valve affects the valve speed, the refrigerant consumption, the valve reliability and the cost of fabrication. For example, valve performance is related to the thermal characteristics of the valve body, e.g. the valve response time is governed by the thermal diffusion time constant. As such, because larger valve bodies tend to have larger thermal diffusion time constants, temperature changes in the valve body tend to occur more slowly. Thus, freezing and/or thawing a fluid plug takes longer for larger valve bodies than it does for smaller valve bodies. Moreover, because the refrigerant and electrical energy consumption of the valve is governed by the thermal mass of the valve body, larger valve bodies tend to consume greater amounts of refrigerant and electrical energy than do smaller valve bodies. Furthermore, the thermal stresses on the valve are governed by the uniformity of the temperature and similarity of the thermal expansion coefficients of the materials used to fabricate the valve, and therefore the reliability and life cycle of the valve are adversely affected by the valve size and material selection.

SUMMARY OF THE INVENTION

A micro-machined freeze-thaw valve is fabricated to overcome problems of known valves, and includes a valve housing that defines a housing cavity and includes a refrigerant tubing inlet, a refrigerant vent, and capillary tubing working fluid inlets and outlets. A valve body is provided, at least a portion of which is lithographically constructed, wherein the valve body includes a refrigerant inlet, a refrigerant outlet and an expansion chamber. The expansion chamber is disposed between the refrigerant inlet and the refrigerant outlet and includes a restriction region. The expansion chamber may include a porous structure disposed upstream of the refrigerant outlet. The valve body also includes one or more conduits that are in intimate thermal contact with the capillary tubing through which the working fluid flows.

The valve body also includes features according to the invention that form a combined electrical heater and temperature sensor element, implemented such as described in U.S. Pat. No. 3,789,190 to Orosy, et al. 1974, which is incorporated in its entirety herein by reference. The valve body is disposed within the housing cavity to form a thermally insulating void between the valve housing and the valve body. The valve body is electrically connected to external controls by a wiring harness and electrical spring contacts. Two or more electrical spring contacts are disposed within the valve housing that contact the valve body at prescribed locations and provide electrical continuity between the valve body and the external controls via the wiring harness.

A method of micro-machining freeze thaw valve bodies according to the invention is also provided and includes obtaining silicon wafer substrates, performing lithography, masking, and etching steps to form refrigerant fluidic features and the working fluid channels for a plurality of similar or different valve bodies. Mating silicon wafer substrates are bonded together to enclose the refrigerant fluidic features and the working fluid channels. Further deposition, lithography and etching processes may be performed to create electrical heating and temperature sensing features and electrical contact pads. Discrete valve bodies are obtained by dicing the bonded wafer assembly and thus creating inlets and outlets for the refrigerant and working fluid capillary tubing conduits along the edges of each die.

Advantages of the valve according to the invention may include fabrication using micro-fabrication techniques to allow for the miniaturization of the valve body beyond the capability of conventional machining techniques. Such implementation advantageously allows for substantial improvements in valve speed, refrigerant consumption, performance reliability and fabrication economy. Micro-fabricated freeze-thaw valves according to the invention can be fabricated as smaller valves to achieve significant improvements in valve response time and energy consumption. Additionally, micro-fabrication of freeze-thaw valves permits the internal features of the refrigerant nozzle, expansion chamber, porous vent, heater and temperature sensor to be fabricated monolithically, i.e. in a single substrate material and thin films, advantageously ensuring the uniformity of the thermal expansion properties and mitigating the effect of thermal stresses. The valve bodies are microfabricated upon silicon substrates. Silicon provides advantageously high thermal diffusivity for fast device speed and low refrigerant and energy consumption, and provides a dual function heating and temperature sensing capability. Micro-fabrication of the valves according to the invention advantageously permits parallel batch fabrication of a plurality of devices of a single embodiment or differentiated, but related embodiments. The range of applications and operational situations of the freeze-thaw valve according to the invention is from stationary applications to battery powered portable applications.

BRIEF DESCRIPTION OF DRAWINGS

The foregoing and other features and advantages of the present invention will be better understood from the following detailed description of illustrative embodiments, taken in conjunction with the accompanying drawings in which:

FIG. 13 is a table illustrating material characteristics for some materials that may be used to construct freeze-thaw valves, according to the invention;

DETAILED DESCRIPTION OF THE INVENTION

Figure 1:
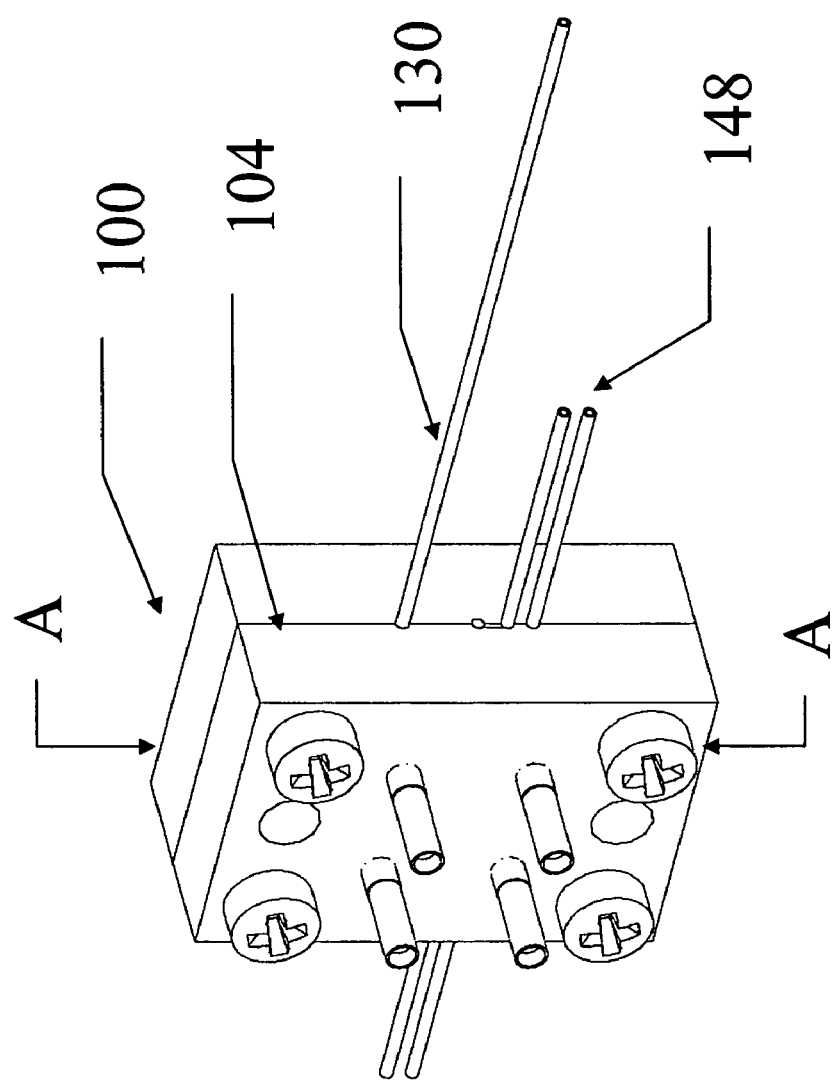
FIG. 1 is an exterior view of the structure of a microfabricated freeze-thaw valve having a valve body and a valve housing, in accordance with a first embodiment.
Figure 2:
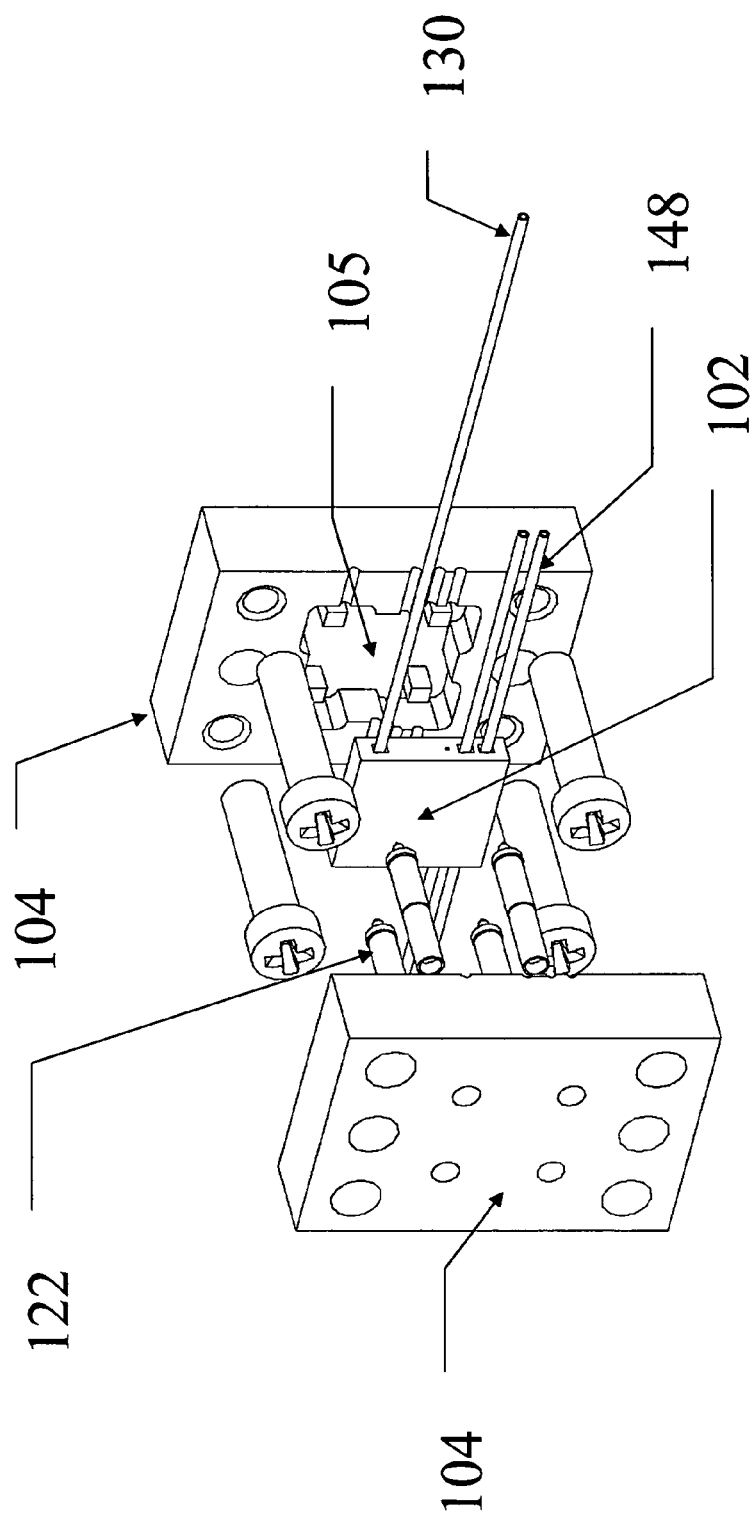
FIG. 2 is an exploded view of the assembly of the micro-fabricated freeze-thaw valve revealing the microfabricated valve body and the internal structure of a valve housing, in accordance with the first embodiment.
Figure 3:
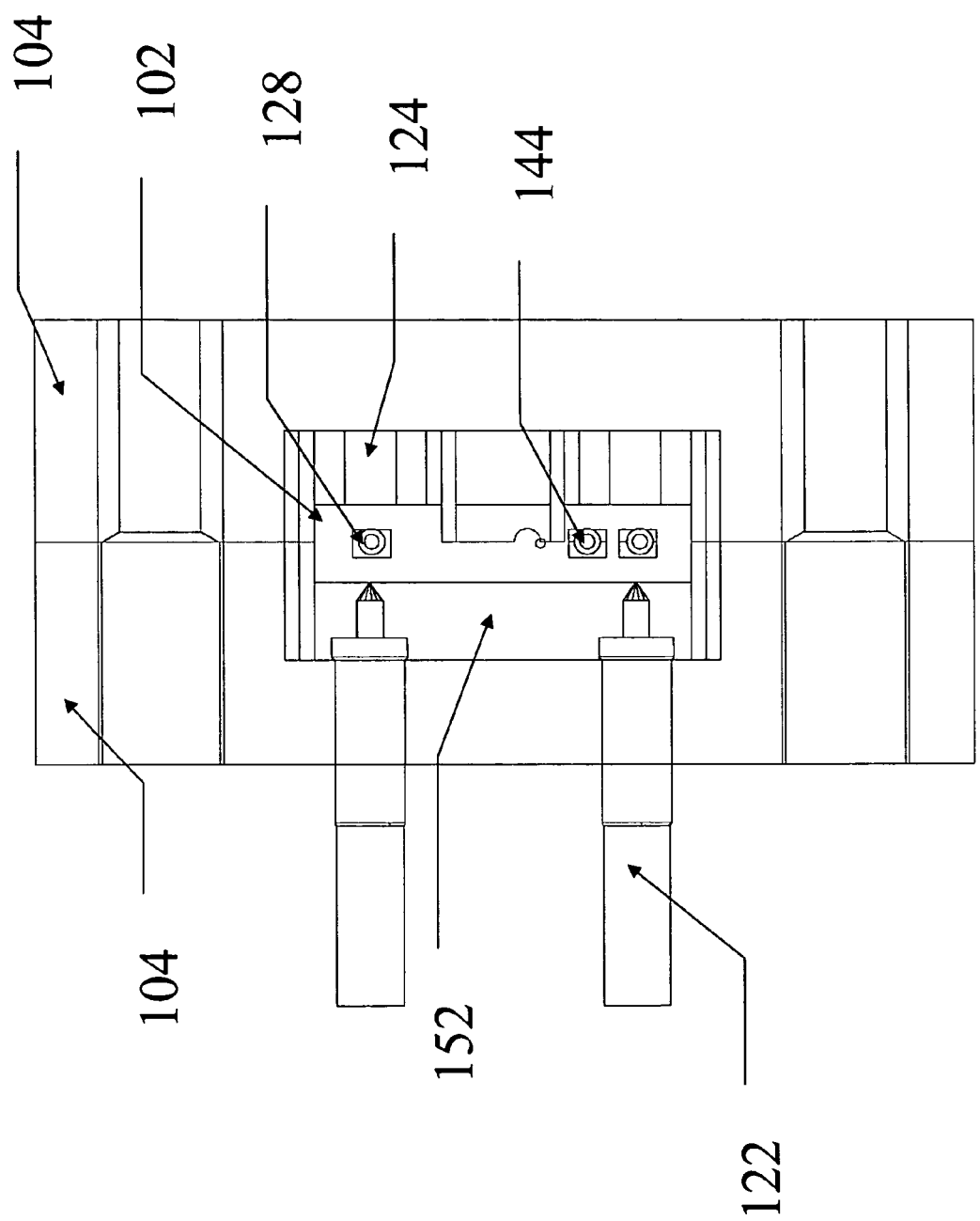
FIG. 3 is a side cross-sectional view of the structure of the freeze-thaw valve assembly, taken along a line A—A in FIG. 1.
Figure 4:
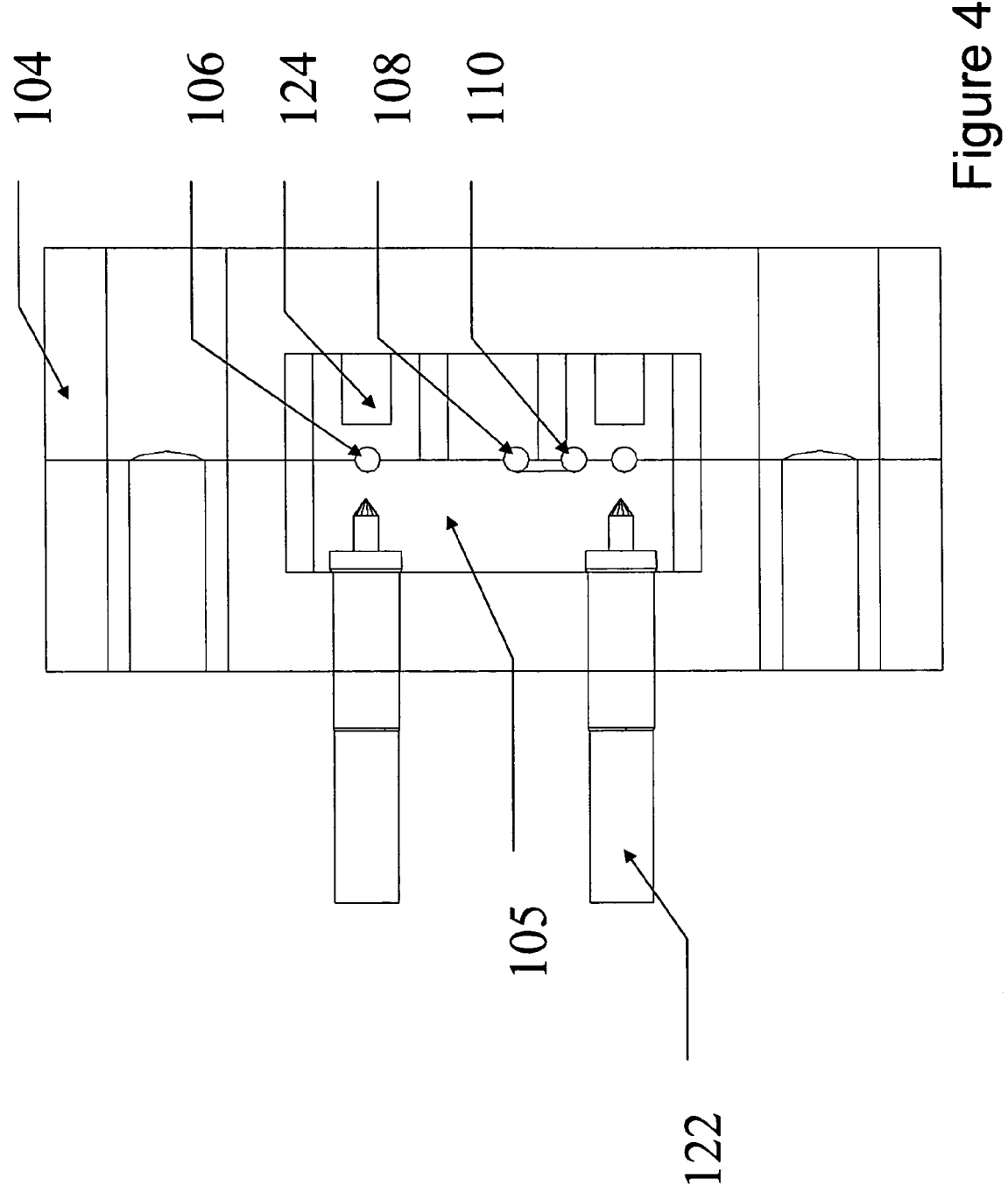
FIG. 4 is the side cross-sectional view of the structure of the freeze-thaw valve housing assembly of FIG. 3 without the valve body, to reveal internal features in the housing, in accordance with the first embodiment.
Figure 5:
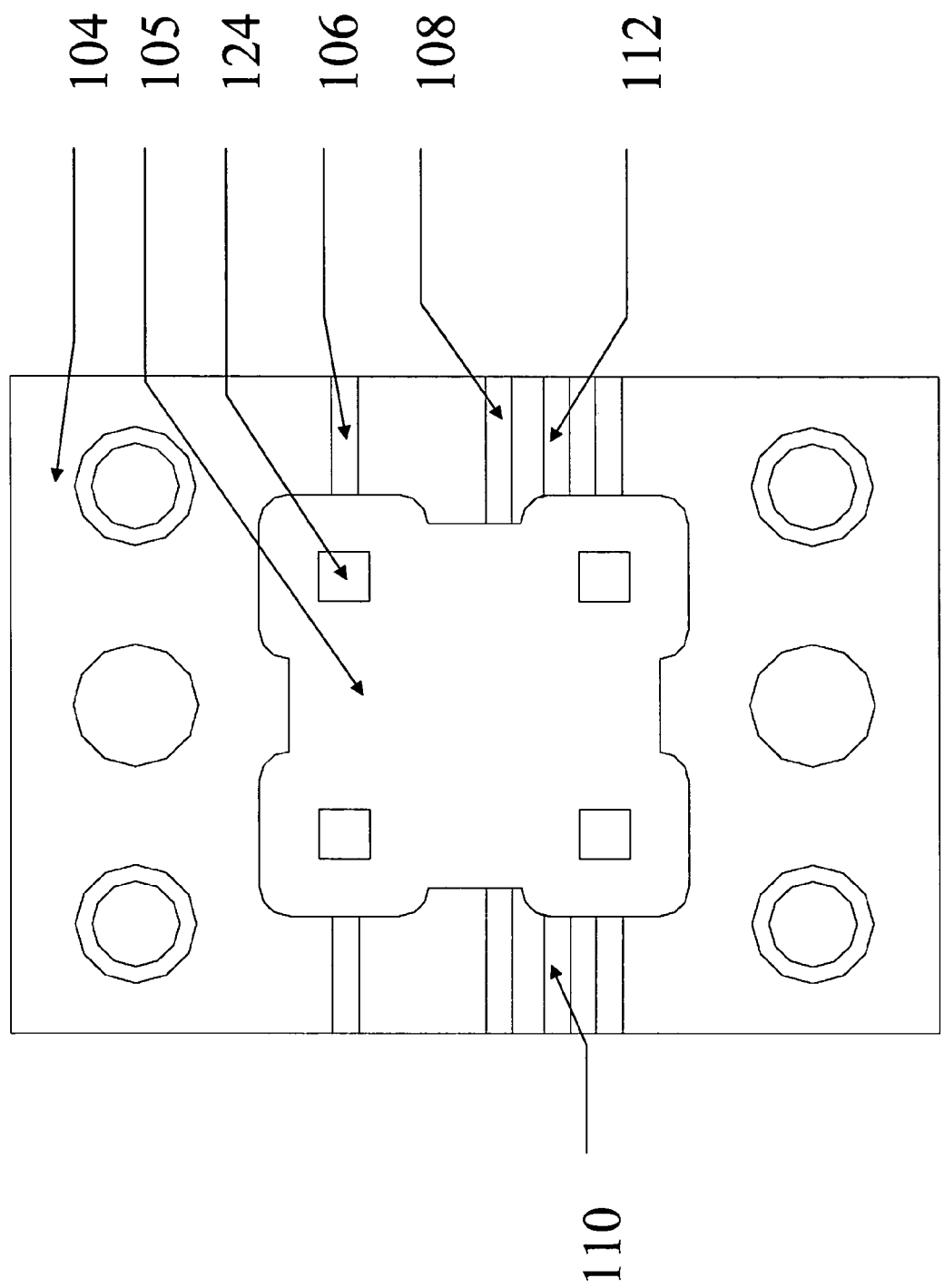
FIG. 5 is a front cross-sectional view of the structure of the valve housing, in accordance with the first embodiment.

Referring to FIGS. 1 through 7, a first embodiment of a freeze thaw valve 100 includes a valve body 102 (best seen in context in FIG. 2), disposed within a valve housing 104. The valve housing 104 defines a housing cavity 105 for containing valve body 102. Referring to FIGS. 4 and 5, the valve housing 104 includes a housing refrigerant inlet 106, a housing refrigerant vent 108, a working fluid capillary tubing inlet 110, a working fluid capillary tubing outlet 112, and at least one mounting feature 124.

Figure 6:
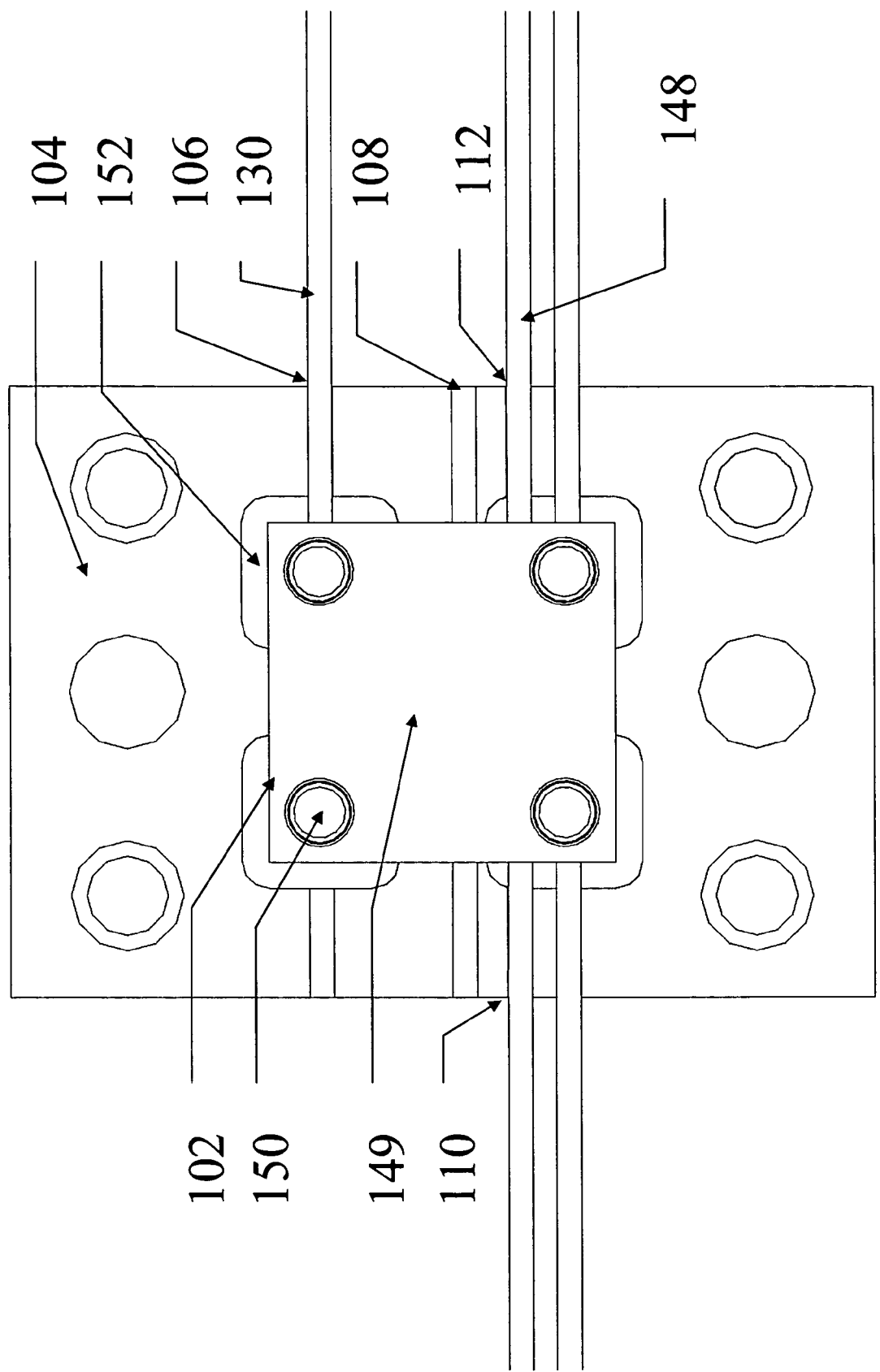
FIG. 6 is a front cross-sectional view of the structure of the freeze-thaw valve assembly showing the placement of the valve body within the housing, in accordance with the first embodiment.
Figure 7A:
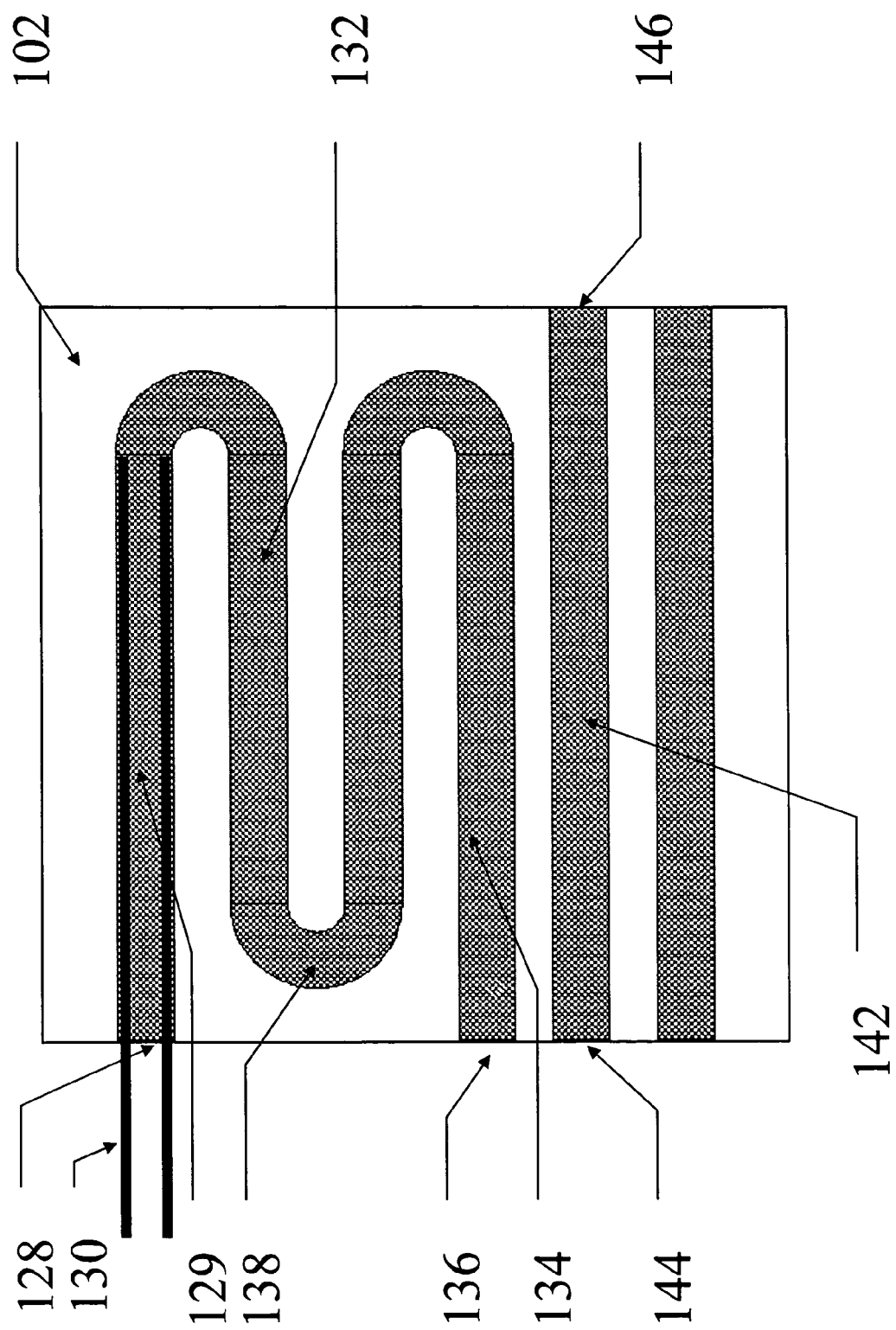
FIG. 7a is a view of internal features within the microfabricated freeze-thaw valve body, in accordance with the first embodiment.
Figure 7B:
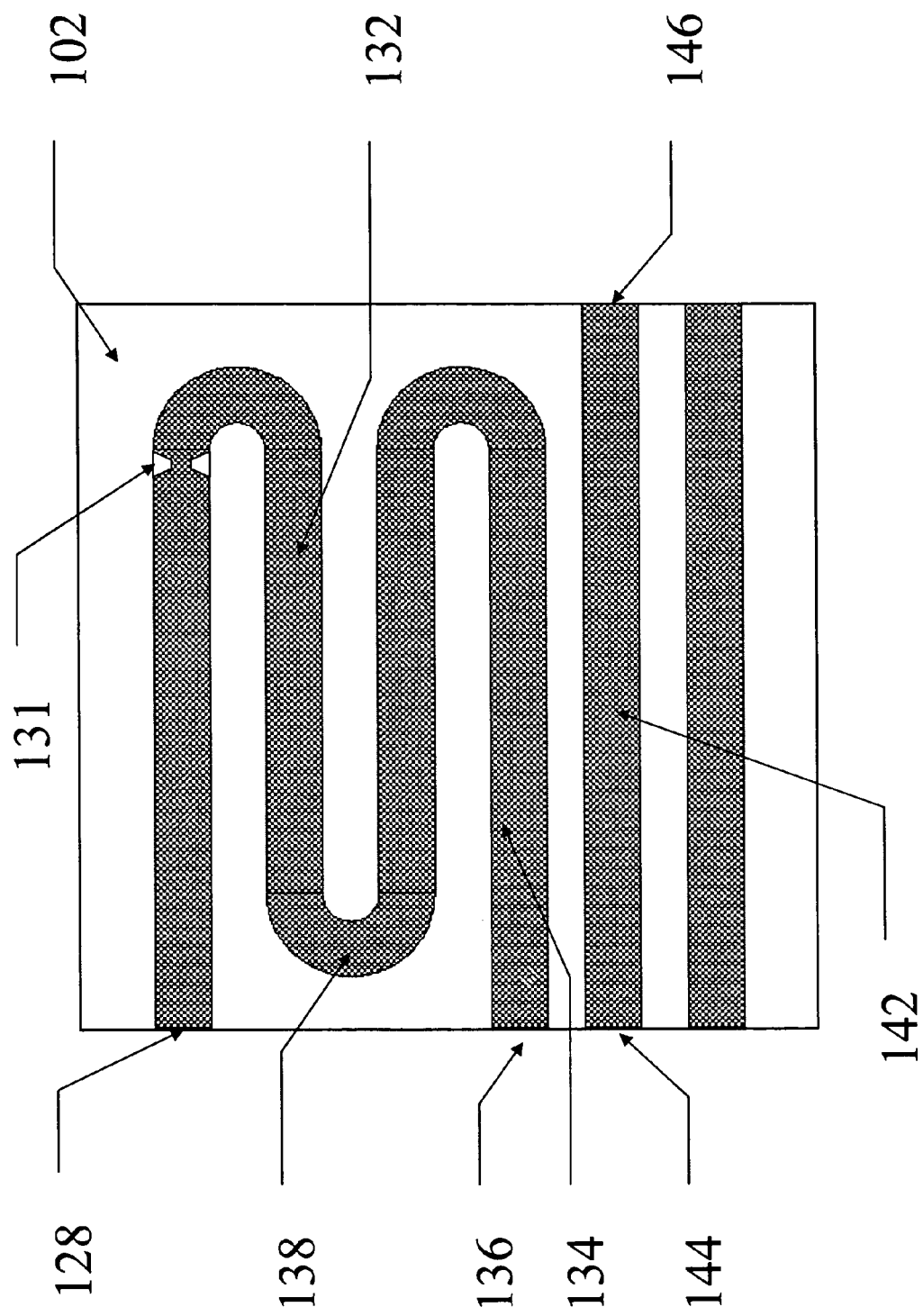
FIG. 7b is a view of internal features within the microfabricated freeze-thaw valve body, in accordance with an alternative first embodiment.

Valve body 102, best illustrated in FIGS. 6, 7a and 7b, includes a refrigerant inlet 128, a refrigerant supply capillary tube 130 extending therefrom, an expansion chamber 132, a refrigerant vent channel 134 and a refrigerant outlet 136. Expansion chamber 132, which can be implemented in various forms as described hereinafter, is in fluid communication with refrigerant inlet 128 and refrigerant outlet 136. Refrigerant supply capillary tube 130 is disposed, e.g. adhesively bonded, into refrigerant inlet 128 to disperse a refrigerant agent into expansion chamber 132. Expansion chamber 132 includes a flow restriction region 138 for restricting vapor flow to advantageously limit refrigerant consumption (alternative configurations of flow restriction elements 140 are described hereinafter with respect to FIGS. 9–12). Valve body 102 also includes at least one conduit 142 each having a conduit inlet 144 and a conduit outlet 146. The at least one conduit 142 is disposed proximate to the expansion chamber 132 for routing capillary tubing 148 through the valve body 102, wherein the capillary tubing extends through conduit inlet 144 and conduit outlet 146. Capillary tubing 148 includes at least one capillary tube that may be inserted through valve body 102 and easily removed or exchanged. The working fluid to be regulated by the freeze-thaw valve flows within the capillary tubing. It is within the capillary tubing enclosed by the conduit that the working fluid is frozen to restrict or stop the flow and thawed to re-establish the flow. It should be appreciated that fluid may be made to flow through, and be frozen and thawed within, the at least one conduit without necessarily requiring capillary tubing disposed therethrough.

Referring more particularly to FIGS. 2 through 5, valve housing 104 includes a plurality of electrical spring contacts 122 and at least one mounting structure 124 for disposing valve body 102 within valve housing 104. The plurality of electrical spring contacts 122 are, illustratively, spring-loaded "pogo pin" probes which are connected to an internal wall of valve housing 104. The use of these spring-loaded "pogo pins" advantageously minimizes thermal conduction to valve housing 104. Ordinary electrical signal wires connect electrical probes 122 with an external power source and/or instrumentation. Housing inlet 106, capillary tubing inlet 110, and capillary tubing outlet 112 are sufficiently sealed to advantageously provide atmospheric isolation between housing cavity 105 and its external environment such that condensable gas/vapor, such as water, contained within housing cavity 105 may be removed in a controlled manner via housing vent 108. Valve housing 104 may be a machined or injection-molded shroud that mechanically supports and thermally isolates valve body 102 from its external environment using encapsulated air and the vaporized refrigerant agent.

Referring now to FIG. 6, valve body 102 includes at least one heating element 149 connected to a plurality of metal contact pads 150 disposed on an external surface of valve body 102. Metal contact pads 150 may be deposited on the external surface of valve body 102 by electrochemical, chemical vapor, physical vapor or sputter deposition and may be comprised, for example, of aluminum, copper, gold, platinum and/or nickel. Heating element 149 may include at least one electrically resistive thin film which may be integrated using standard lithography and deposition techniques. In conductive and semiconductive substrates, heating element 149 may be incorporated by electrical Joule heating of the substrate itself.

Referring to FIGS. 2, 3 and 6, valve body 102 is disposed within housing cavity 105 via at least one mounting structure 124 so that an insulating cavity 152, best illustrated in FIG. 3, is defined between valve body 102 and the internal surface of valve housing 104, wherein valve body 102 is mechanically clamped to mounting structure 124 by the spring electrical contacts 122. Insulating cavity 152 provides thermal isolation between valve body 102 and valve housing 104 via encapsulated air and refrigerant agent vapor vented from refrigerant outlet 136. Moreover, valve body 102 is disposed within housing cavity 105 so that each of the plurality of electrical probes 122 is associated in a spring-contact manner with at least one of the plurality of metal contact pads 150. Furthermore, valve body 102 is disposed within housing cavity 105 such that refrigerant supply capillary tube 130 extends from housing inlet 106 and such that capillary tubing 148 extends from capillary tubing inlet 110 and capillary tubing outlet 112.

Referring to FIGS. 6 and 7a and in accordance with the first embodiment, as a fluid is flowing through capillary tubing 148, a pressurized liquid refrigerant agent, e.g. $CO_2$, is injected into expansion chamber 132 from refrigerant supply capillary tube 130 which is inserted into refrigerant inlet 128 and into refrigerant tubing conduit 129. Refrigerant tubing 130 is connected to an external refrigerant agent source (not shown), and provides a reduced inner diameter within the refrigerant tubing conduit 129. The refrigerant agent flows through refrigerant tubing 130 and into expansion chamber 132 (FIG. 7a), where the increased inner diameter, i.e. increased over the inner diameter of the refrigerant tubing conduit 129, presents a reduced pressure region. As the refrigerant agent flows into expansion chamber 132, the lower pressure of expansion chamber 132 causes the refrigerant agent to expand from a liquid state into a cold gaseous state. When the refrigerant used is carbon dioxide the expansion produces both cold gas and solid (dry ice). During this expansion, the refrigerant agent draws heat from valve body 102, cooling valve body 102 and capillary tubing 148. This causes the liquid flowing in at least a portion of capillary tubing 148 to freeze creating a frozen fluid plug which advantageously occludes the liquid flow within capillary tubing 148, thereby causing capillary tubing 148 to be "closed".

As illustrated in FIG. 7b, pressure differential can be created by alternative structures. In this alternative embodiment the refrigerant tubing is not inserted into the refrigerant inlet 128 to form the lesser inner diameter refrigerant tubing conduit 129. Instead, an orifice 131 is fabricated upstream and proximate to the expansion chamber 132. The orifice 131 causes an abrupt, localized pressure drop such that as the refrigerant passes through the orifice it passes into a lower pressure region in the expansion chamber 132. Again, the lower pressure of expansion chamber 132 causes the refrigerant agent to expand from a liquid state into a cold gaseous state, and during this expansion, the refrigerant agent draws heat from valve body 102, cooling valve body 102 and capillary tubing 148. It should be appreciated that various geometries may be implemented proximate to the entrance of the expansion chamber 132 to effect a lower pressure expansion chamber, and further it should be appreciated that an orifice of any of various geometries can be used in conjunction with a lesser inner diameter refrigerant tubing conduit 129. Similarly, any of various couplings may be implemented to deliver refrigerant from refrigerant tubing to the refrigerant inlet 128.

In addition to freezing capillary tubing 148, the cooling effect of the refrigerant expansion causes the refrigerant agent to solidify into solid particulate carbon dioxide (dry ice) under the low-pressure low-temperature conditions existing in expansion chamber 132. These solid crystals are captured or deposited on flow restrictions 138 (and flow restriction elements 140, such as post arrays or serpentine channel sections illustrated in FIGS. 9–12), advantageously restricting or occluding vapor flow of the refrigerant agent and limiting the volume of refrigerant agent used. As a result, the flow of refrigerant agent is reduced to a nominal amount and the solid refrigerant agent undergoes sublimation in the area of the restrictions. This solid refrigerant agent sublimation provides continued cooling, thus allowing freeze-thaw valve 100 to remain closed. Generally, the nominal amount of refrigerant agent flowing past flow restrictions is exhausted into insulating cavity 152 via refrigerant outlet 136 and allowed to flow over the external surface of valve body 102. The refrigerant agent is then exhausted from freeze-thaw valve 100 via housing vent 108 where it may be captured. In the case of carbon dioxide, the small amounts used are not captured, as it poses no harm and has little residual value. Refrigerants such as liquid nitrogen or argon could be vented without recovery as well. Other refrigerants could be captured by providing an exhaust tube of larger diameter to an apparatus for recompressing and/or condensing the vapor. To cause the fluid in capillary tubing 148 to begin flowing, i.e. "opening" freeze-thaw valve 100, the temperature of valve body 102 is raised by terminating the refrigerant agent flow to freeze-thaw valve 100 and/or by heating valve body 102 via heating element 149.

Figure 9:
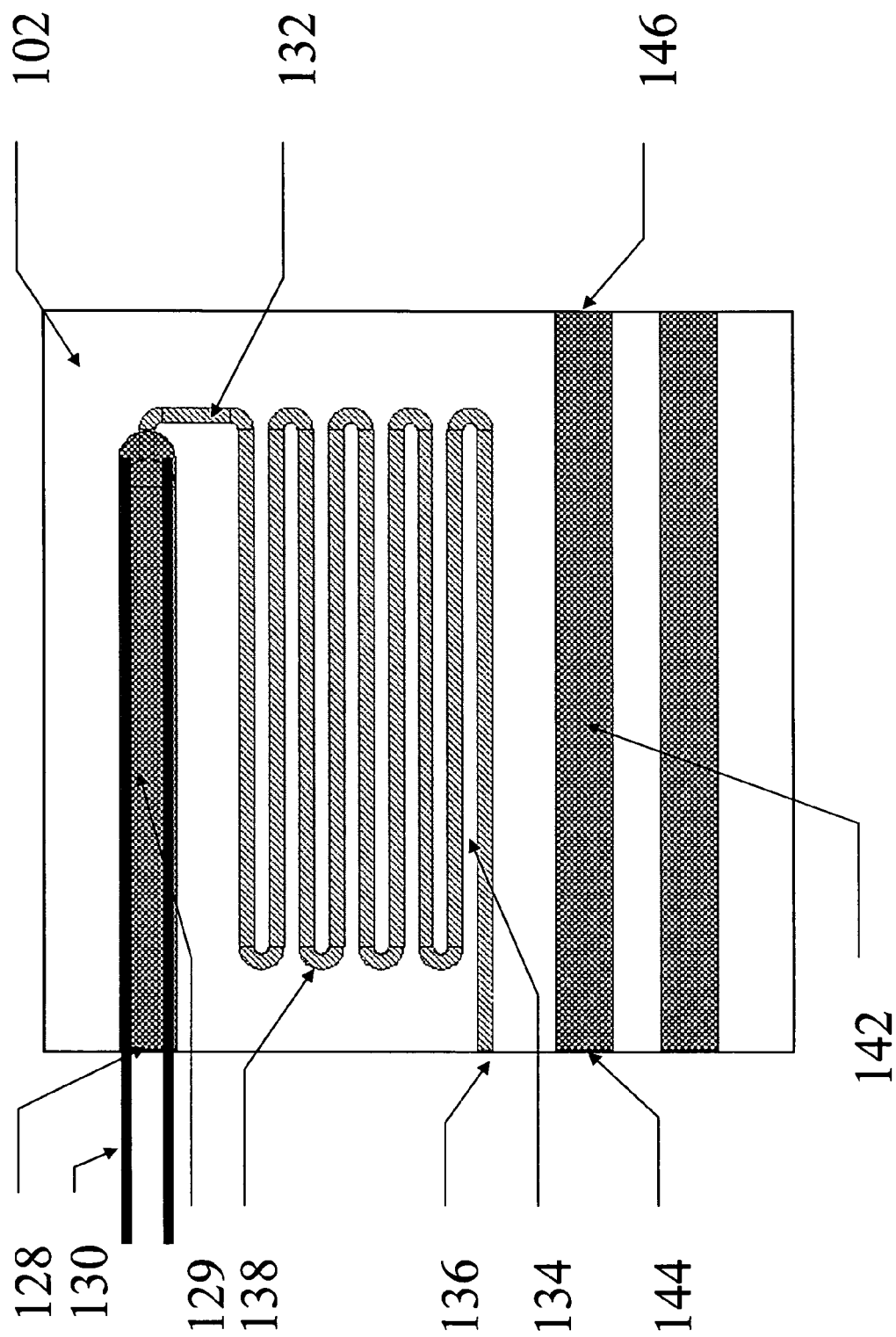
FIG. 9 is a view of internal features within a microfabricated freeze-thaw valve body, in accordance with a third embodiment.

Referring to FIG. 9 and an illustrative flow restriction element 140a therein, if the temperature of valve body 102 is increased by its surrounding environment, the solid refrigerant agent may revert back into its liquid form causing pin-holes or fissures in the solids-retaining restriction region 140a, thus allowing the flow of the liquid refrigerant agent to increase. As this liquid refrigerant exits flow restriction region 140a, the refrigerant agent expands back into a gas providing the necessary cooling to re-seal fissures in the solid refrigerant agent. Valve body 102 may be comprised of materials having high thermal diffusivity which allows the temperature of freeze-thaw valve 100 to be lowered rapidly. In this closed, self-sealing state, the refrigerant agent consumed by freeze-thaw valve 100 is due either to the resealing events or sublimation of the refrigerant at the restriction surface. Moreover, the efficiency of freeze-thaw valve 100, with respect to its consumption of refrigerant agent, may be improved by thermally insulating valve body 102 from its surrounding environment, which also serves to prevent frost build up on valve body 102 from ambient humidity.

It should be appreciated that this configuration advantageously allows a refrigerant agent vented from valve body 102, such as $CO_2$ gas, to be exhausted over the external surface of valve body 102 and out housing vent 108. This aids in preventing water from condensing onto valve body 102 and freezing. Furthermore, the use of capillary tubing 148 substantially eliminates any issues that may arise with regard to material compatibility and/or unswept dead volumes and may include one or more capillary tubes for insertion through valve body 102 to allow for easy removal or exchange. A plurality of working fluid capillary conduits advantageously facilitates the synchronous valving of a plurality of distinct working fluid flows by a single valve body.

The performance of expansion chamber 132 may be dependent upon the design of the expansion chamber 132, therefore, certain characteristics should be considered during the design of expansion chamber 132, including the maximum flow rate of the refrigerant agent, the thermodynamic properties of the refrigerant agent, the temperature of the refrigerant agent at refrigerant outlet 136, the thermal mass of freeze-thaw valve body 102, the pressure distribution of the refrigerant agent within expansion chamber 132 and/or the occlusion of refrigerant flow at flow restriction region 140a by the refrigerant agent, e.g. solid carbon dioxide. It should also be noted that the thermal mass of valve body 102 dominates the heating/cooling load making the latent heat of fusion of the valved fluid insignificant. As such, valve body 102 should be designed such that refrigerant channel 130 and refrigerant vent channel 134 are sufficiently large to allow a refrigerant agent to flow through expansion chamber 132 fast enough to cool expansion chamber 132 and capillary tubing 148 in a sufficiently short period of time, while providing a path sufficient to capture the solid refrigerant agent, e.g. carbon dioxide, at flow restriction region 140a in order to occlude the gas flow and advantageously minimize refrigerant consumption. Although valve body 102 includes heating element 149, valve body 102 may be heated using any of various suitable methods, such as applying warm air or liquid, or radio frequency, microwave, infrared, visible, or ionizing radiation to the external surface of freeze-thaw valve body 102.

It should be appreciated that capillary freeze-thaw valves have very broad utility across a wide spectrum of microfluidic applications. The use of capillaries as flow conduits advantageously makes these valves particularly useful in micro-analytical and micro-separation systems that commonly employ capillary conduits and that are particularly sensitive to unswept "dead" volumes. The ability of these valves to successfully operate under very high pressures advantageously makes the valves particularly useful for high pressure liquid chromatography systems, e.g. the frozen fluid plug in a capillary freeze-thaw valve is able to withstand pressure gradients in excess of 10,000 psi per millimeter in micro-bore capillaries. The capillary freeze-thaw valve disclosed herein has a substantial advantage over current micro-fluidic valve technologies by providing a frozen liquid plug that forms an extremely tight seal within the capillary conduit to produce a valve that has negligible leakage. The embodiments disclosed herein also advantageously provide for an enhanced control of the freeze-thaw valve via indirect cooling of the fluid in the capillary channel by effectively encapsulating the capillary channel in the thermally conductive refrigerant agent expansion chamber body. The expansion chamber body advantageously allows the refrigerant agent to be used more efficiently by capturing and utilizing more of the enthalpy change of the fluid to shut down the flow of the refrigerant agent by blocking the expansion channel with solid carbon dioxide (dry ice).

Freeze-thaw valve 100 may be constructed from a variety of materials and the method of fabrication of freeze-thaw valve 100 may be dependent upon the materials used. For example, while metal devices are readily fabricated by fusion bonding, thermal cycling to extremely low temperatures makes it a challenge to bond heater elements to metal. However, glass devices fabricated by standard micro-fluidic chip techniques may have thin film resistors integrated into the chip as heaters. Moreover, silicon devices may be fabricated using standard Micro-Electro-Mechanical System (MEMS) processes including etching and high-temperature fusion bonding such that additional heating elements would not be required because the bulk silicon itself may be used for resistive heating and temperature sensing. With electrical interconnects disposed on the valve body 102, the electrical resistance change of the valve body or a film or doped region as known in the art can be used to sense the temperature of the valve body 102 for feedback control of the heater or refrigerant. FIG. 13 illustrates properties for a variety of materials that may be used singly or in combination to fabricate freeze-thaw valve 100. These materials have known properties that are useful for calculating heating/cooling times and energy requirements for freeze-thaw valve 100. For example, it is known that the thermal time constant of a material is inversely proportional to its thermal diffusivity. Thus, materials having large thermal diffusivities, e.g. silver, copper, and silicon, are desired because they heat and cool quickly, advantageously allowing for the rapid valving of the working fluids.

Silicon dioxide (glass) and/or silicon may be used as construction materials because they have a small specific heat capacity and would advantageously allow for minimal refrigerant and electrical energy requirements for freezing and thawing, respectively. Additionally, silicon has the added advantage of not needing an external heater or temperature sensor because heating may be achieved by using the bulk material itself for resistive heating. Because the resistance of the bulk material is dependent upon the temperature of the material, the temperature of freeze-thaw valve 100 may be determined from changes in the resistance of the material. These temperature measurements may be communicated to external instrumentation and used for feedback control of freeze-thaw valve 100. Freeze-thaw valve 100 may also be monolithically fabricated by defining flow channels and capillary conduits in a planar substrate, wherein refrigerant inlet 128, refrigerant channel 130, expansion chamber 132, refrigerant vent channel 134, refrigerant outlet 136 and fluidic conduit 142 are advantageously created via lithographic and etching procedures. Moreover, freeze-thaw valve 100 may be micro-fabricated as an array of devices on a large substrate to take advantage of batch processing.

It should be appreciated that a plurality of embodiments having different expansion chamber design class variants may be created and fabricated substantially simultaneously using parallel batch processing methods. These embodiments include, but are not limited to, at least five main design classes as illustrated in FIGS. 7–12.

Expansion chamber embodiment 1: Referring to FIG. 7a, the valve body 102 may be designed with an expansion chamber consisting of a uniform cross-section channel between the refrigerant inlet 128 and outlet 136. The cross-section dimensions are made for the insertion of the refrigerant supply capillary tube 130 as illustrated in FIGS. 6 and 7a. In this illustrative embodiment the channel advantageously includes serpentine bends to facilitate longer channel length for heat transfer between the vaporizing refrigerant and the valve body 102 and to facilitate the accretion of solid carbon dioxide. The serpentine bends serve the function of flow restriction features 138 (and 140 of the embodiments of FIGS. 9–12), allowing the accretion of carbon dioxide to occlude the refrigerant flow.

Figure 8:
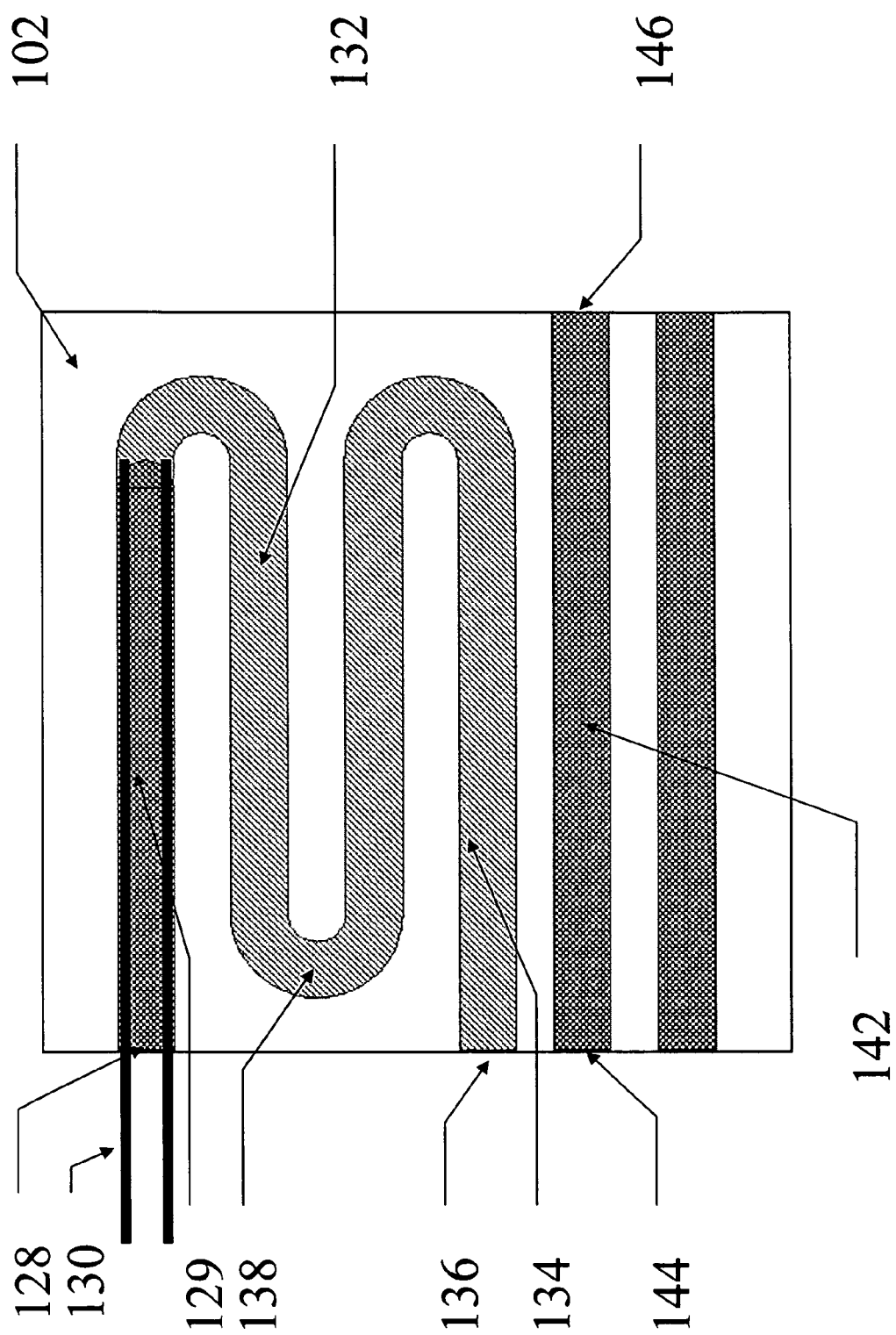
FIG. 8 is a view of the internal features within a microfabricated freeze-thaw valve body, in accordance with a second embodiment.

Expansion chamber embodiment 2: Referring to FIGS. 8 and 9, the valve body 102 may be designed with a refrigerant supply capillary tubing conduit 129 in communication with an expansion chamber of smaller uniform cross-section (best seen in FIG. 9), with restrictive serpentine flow restriction elements (140a in FIG. 9), in communication with a refrigerant vent channel 134 disposed between the refrigerant inlet 128 and outlet 136. It should be appreciated that in a microfabricated structure according to the invention, the increasing non-uniform cross-section can be achieved in various ways such as by decreasing the total cross-sectional dimensions as in FIG. 9 or by decreasing the width or depth of an etch such as in FIG. 8.

Figure 10:
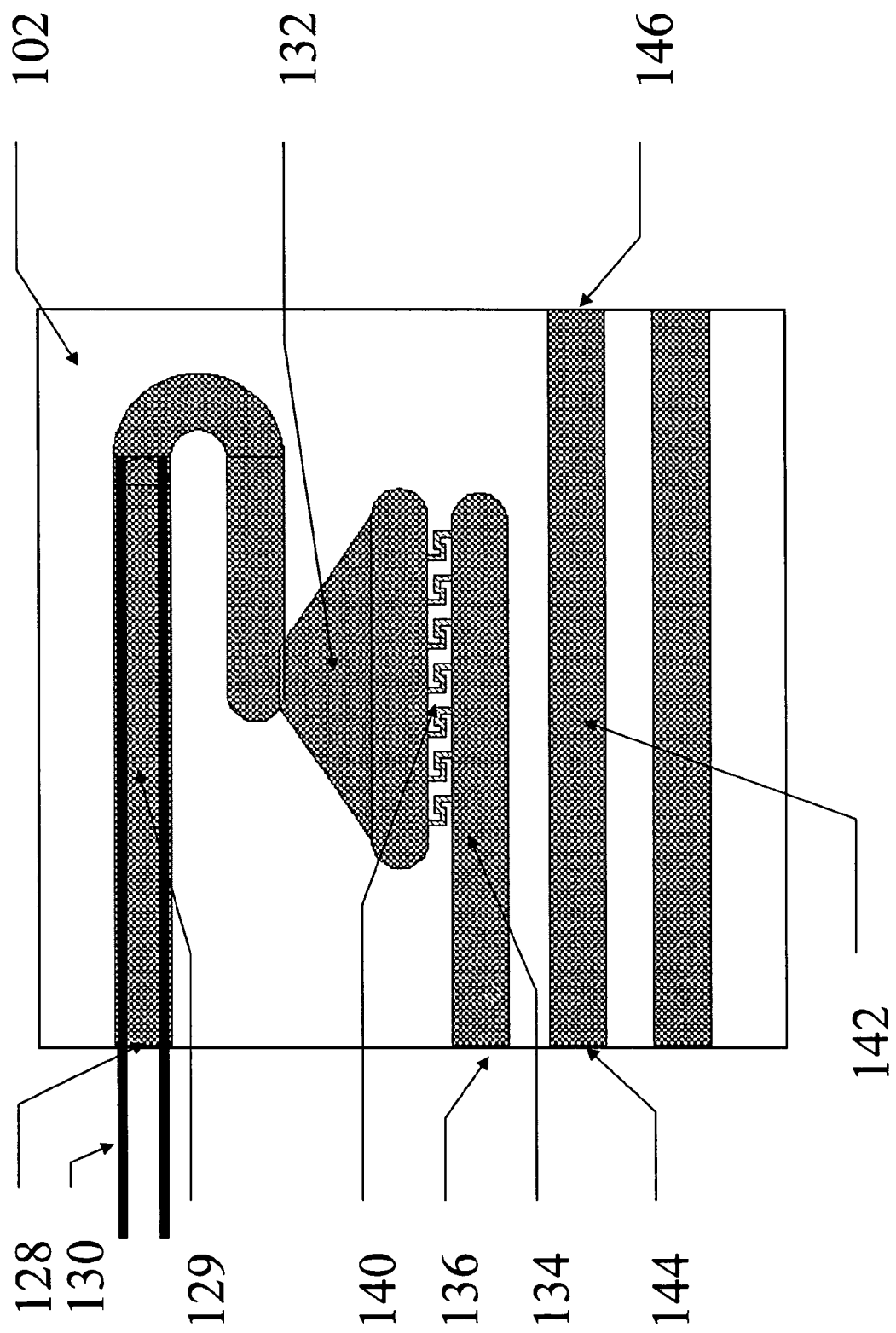
FIG. 10 is a view of internal features within a microfabricated freeze-thaw valve body, in accordance with a fourth embodiment.

Expansion chamber embodiment 3: Referring to FIG. 10, the valve body 102 may be designed with a refrigerant supply capillary tubing conduit 129 in communication with an expansion chamber of smaller non-uniform cross-section in communication with highly restrictive serpentine flow restriction elements 140b in communication with a refrigerant vent channel 134 disposed between the refrigerant inlet 128 and outlet 136.

Figure 11:
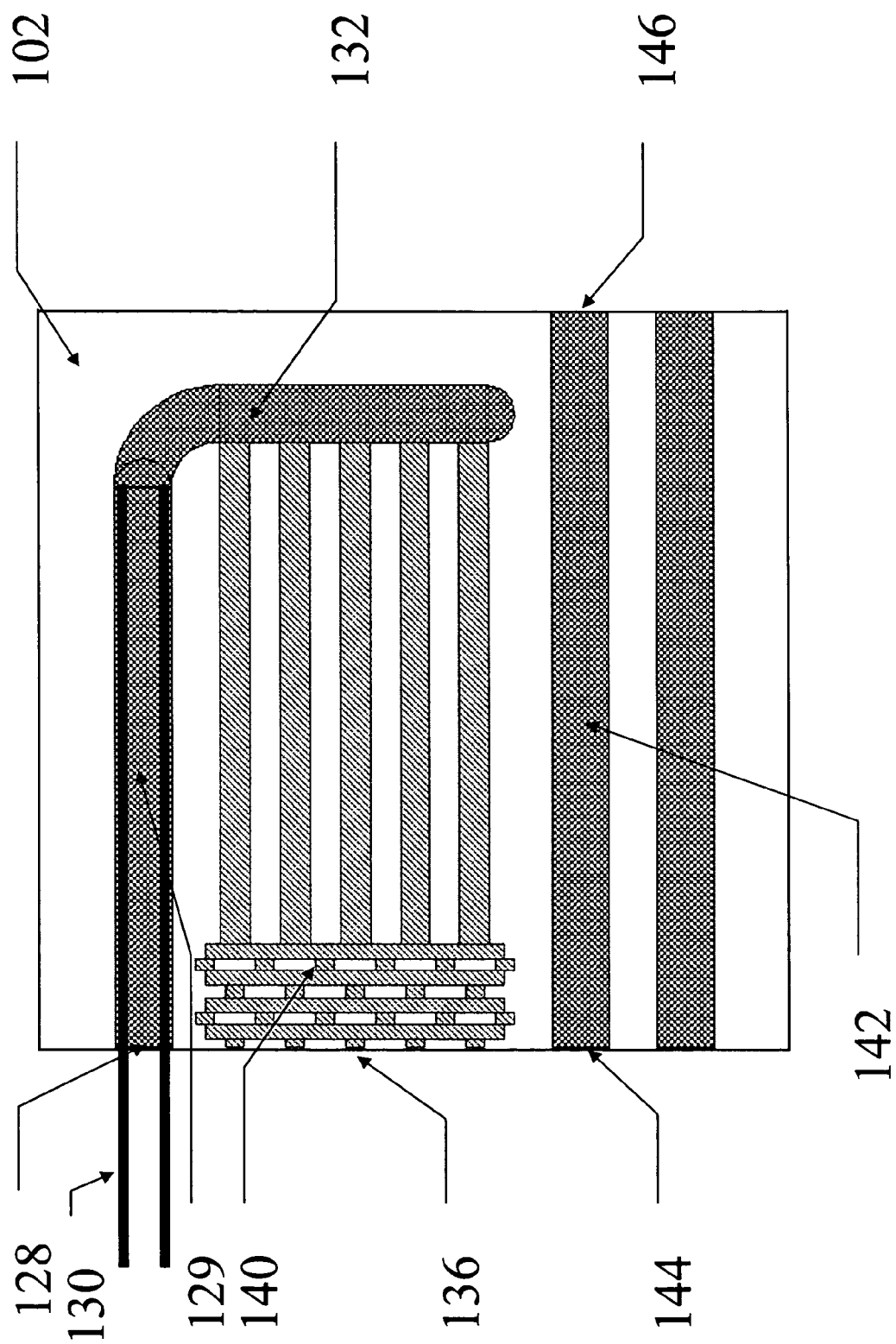
FIG. 11 is a view of internal features within a microfabricated freeze-thaw valve body, in accordance with a fifth embodiment.

Expansion chamber embodiment 4: Referring to FIG. 11, the valve body 102 may be designed with a refrigerant supply capillary tubing conduit 129 in communication with a plurality of parallel channels 140c serving as the expansion chamber in communication with a highly restrictive post array flow restriction vent 141 disposed between the refrigerant inlet 128 and a plurality of outlets 136.

Figure 12:
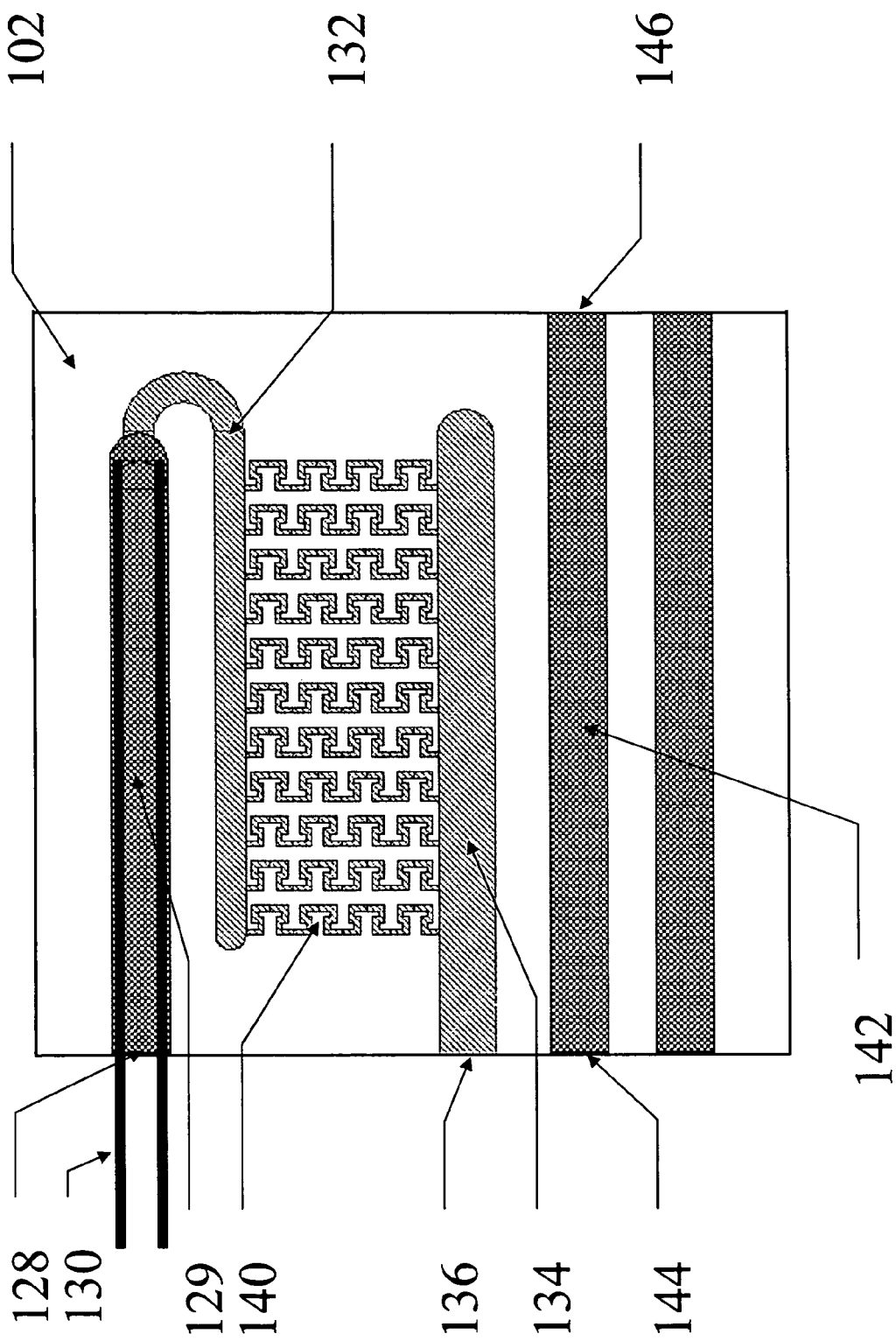
FIG. 12 is a view of internal features within a microfabricated freeze-thaw valve body, in accordance with a sixth embodiment.

Expansion chamber embodiment 5: Referring to FIG. 12, the valve body 102 may be designed with a refrigerant supply capillary tubing conduit 129 in communication with a expansion chamber 132 in communication with a plurality of highly restrictive serpentine restriction elements 140d in communication with a refrigerant vent channel 134 disposed between the refrigerant inlet 128 and outlets 136.

It should be noted that performance of expansion chamber 132 may be optimized by varying the dimensions of the expansion chamber, flow restrictions, and refrigerant vents. These dimensions may be varied by width and length by modifying the lithography masks, or in depth of the etching processes. It should be appreciated by those skilled in the art that a plurality of feature depths may be incorporated into the valve body 102 using a series of lithography, masking, and etch steps. Specifically, this may be accomplished via a first lithography stage that may be used to define features on a substrate by performing a first etch of less than the depth required for the capillary tubing inlets 128 and 144 and outlets 146. A second lithography stage may then be used to define deeper features on the substrate by performing a second etch of approximately 150–400 microns. Mating substrates, which may or may not be symmetrical, may be joined face-to-face via a thermal or anodic bonding process, wherein the bonded substrates may be diced apart into free discrete devices.

Figure 14:
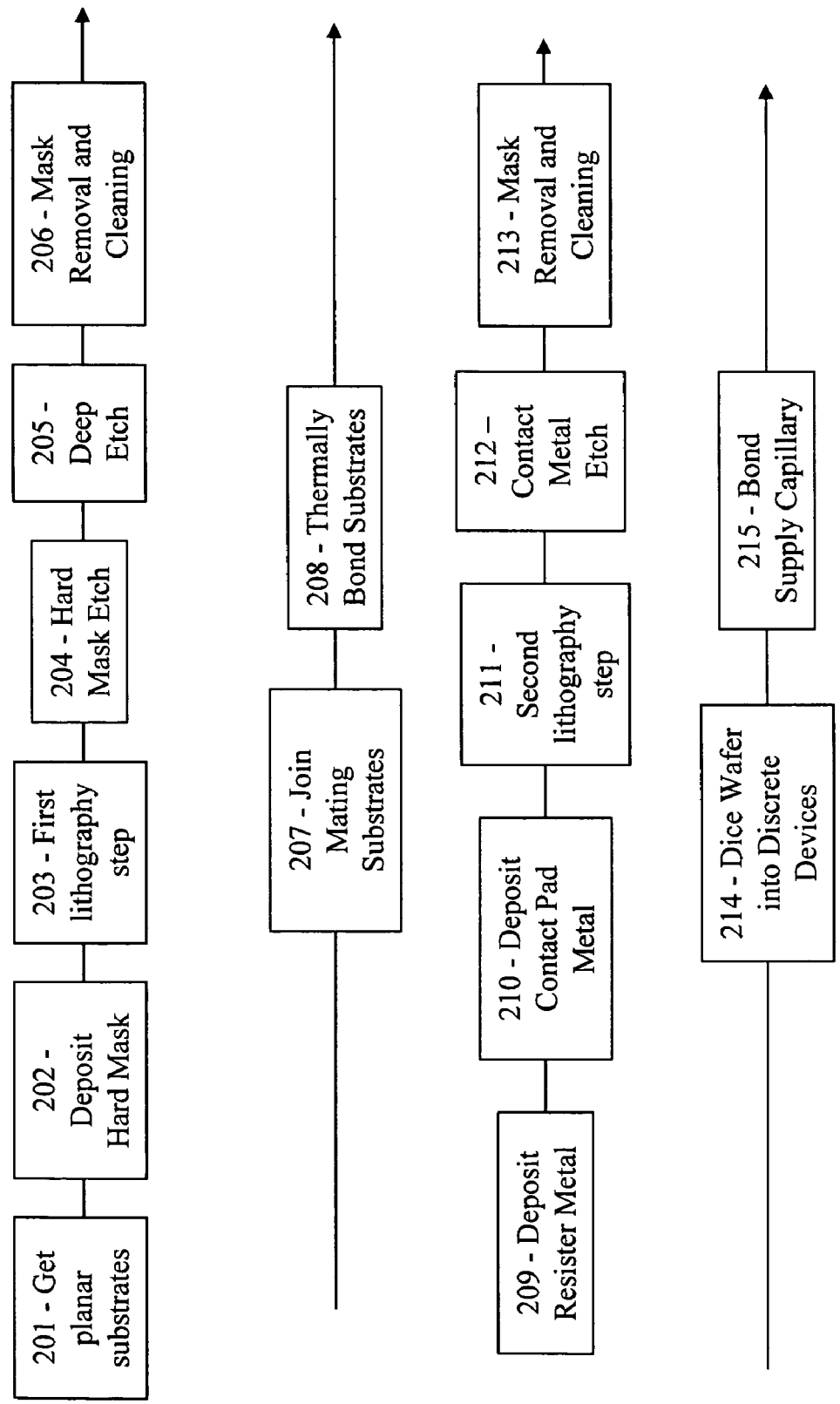
FIG. 14 is a block diagram of a method for micromachining a freeze-thaw valve, in accordance with a first exemplary embodiment.

Referring to FIG. 14, a method 200 for micro-machining freeze-thaw valve bodies 102 from a planar substrate is illustrated. Once a planar substrate is obtained, as shown in block 201, a hardmask material is applied 202, and a first lithography stage 203 is performed to define the internal features including channels, expansion chamber, restriction regions, and ports. It should be appreciated that the material type and thickness of hard mask being deposited is dependent upon the type of etching process performed. For example, if the etching process is a wet etch of silicon, then the material being deposited may include silicon nitride approximately 0.5 microns thick. Whereas, if the etching process is a Bosch plasma etch, then the material being deposited may include aluminum approximately 0.25 microns thick. The first lithography stage includes applying photoresist, exposing the photoresist through a photomask and developing the pattern.

The pattern is transferred to the hardmask by thin film mask wet or plasma etching 204 and to the substrate via deep wet or plasma etching 205, which is controlled to achieve the proper depth. For silicon substrates, the deep etch may be isotropic or anisotropic, accomplished using potassium hydroxide or ethylenediamine pyrocatechol wet etch or a Bosch plasma etch processes.

Following the deep substrate etch, the hard mask material is removed from the substrate and the substrate is cleaned, as shown in block 206. The substrate may be cleaned using a piranha solution (e.g. a mixture of $H_2SO_4$ and $H_2O_2$ solutions) and/or via any solution suitable to the desired end purpose, such as IPA+HF+DI water. Mating substrates, which may or may not be symmetrical, are aligned to be joined face-to-face 207. The aligned substrates are disposed within an 1150° C. furnace for silicon fusion bonding 208.

The dual function temperature sensing and substrate heating elements are formed on non-conductive substrates by applying a thin (<1000 nm) metal film such as chromium 209 to one side of the exterior of the bonded wafer assembly. Adhesion promoting layers such as titanium and tantalum may be used. Metal contact pads 150 are fabricated onto the exterior of the bonded wafer assembly by depositing contact metal 210 such as copper, aluminum, or gold on top of the resistive film. The pattern for the contact pads is lithographically defined 211 in alignment with the internal devices. The contact pads are realized by preferentially etching the unmasked contact metal off of the resistive film, 212. A cleaning step 213 is then performed.

The individual valve bodies are completed by dicing the substrate into a plurality of devices, 214, having a predetermined size, such as 5 mm×5 mm dice. The dicing procedure is conducted to reveal the inlets and outlets on each die. Once this has been accomplished, refrigerant channel 130 is adhesively bonded to each wafer substrate, as shown in block 215. Freeze-thaw valve body 102 may be sized such that two four-inch diameter bonded silicon wafer substrates may produce as many as 200 discrete valve bodies. Moreover, the micro-fabricated devices may easily be constructed with a mechanical envelope of 0.030 cubic centimeters, less than half the volume of a small conventionally machined device.

Figure 15:
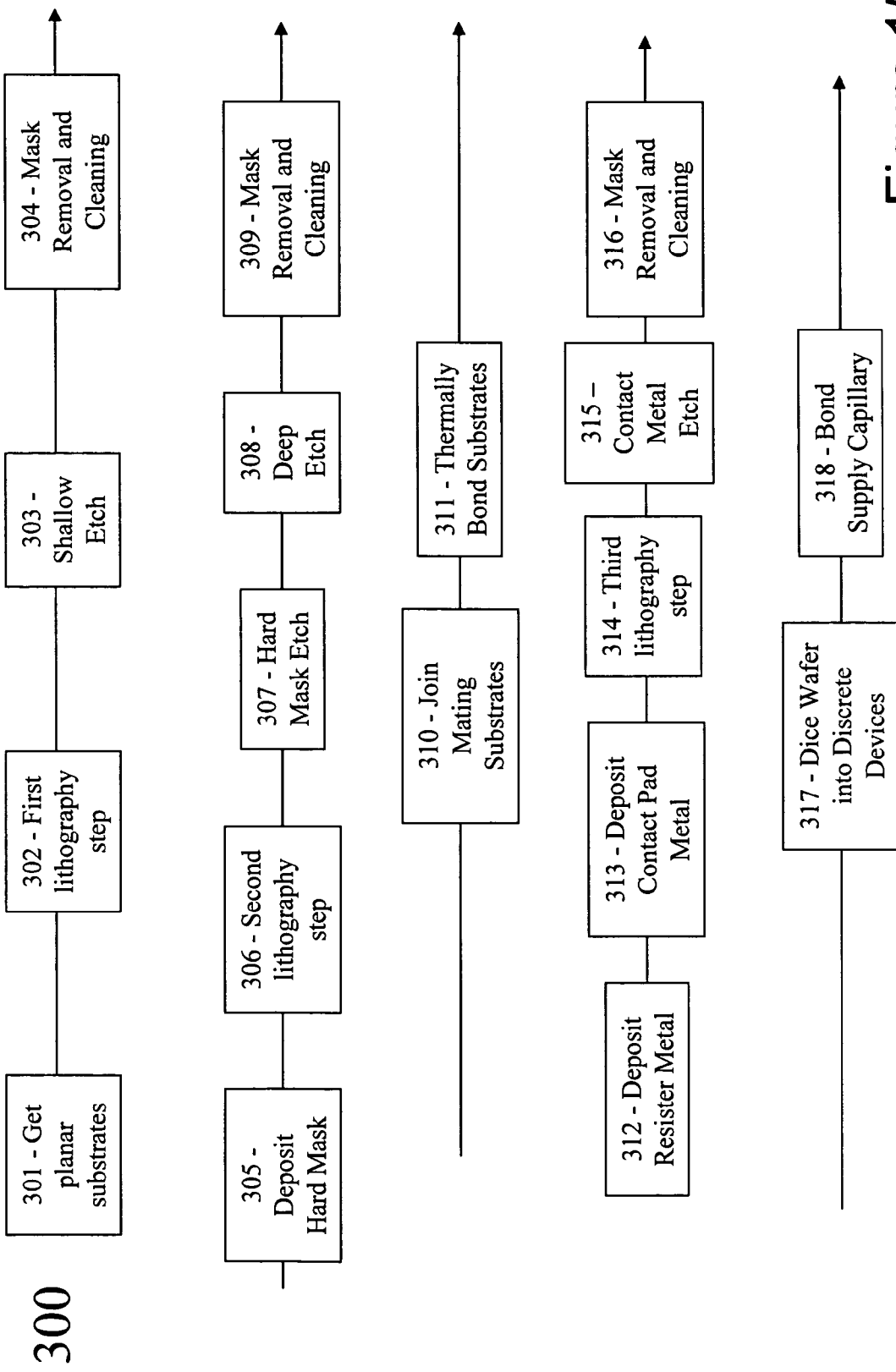
FIG. 15 is a block diagram of a method for micromachining a freeze-thaw valve, in accordance with a second exemplary embodiment.

Referring to FIG. 15, a method 300 for micro-machining freeze-thaw valve bodies 102 from a planar substrate having shallow features from an additional lithography step is illustrated. Once a silicon substrate is obtained, as shown in block 301, a first lithography stage is performed to create restriction regions and a nozzle via a silicon shallow pattern etch, as represented in block 302. The first lithography stage includes applying photoresist, exposing the photoresist through a photomask and developing the pattern. The first lithography pattern is transferred to the silicon substrate by a wet chemical or plasma etching step, which is controlled to achieve the proper depth. The photoresist is removed using typical techniques such as solvent washing in acetone, ozone and ultraviolet light exposure, or oxygen plasma.

Prior to a second lithography step, a hardmask material is deposited, 305. A second lithography stage is performed to create a deep pattern etch, as shown in block 306. After the second lithography stage, a second silicon etch is performed to define deeper features in the substrate of approximately 150–400 microns.

The second lithography step is conducted in the same manner as the first. The second etch pattern is transferred to the hardmask material using wet chemical or plasma etching, 307. The pattern is then transferred to the substrate by a suitable etching process 308. For silicon substrates, the deep etch may be isotropic or anisotropic, accomplished using potassium hydroxide or ethylenediamine pyrocatechol wet etch or a Bosch plasma etch processes.

Following the second silicon etch, the hard mask material is removed from the substrate and the substrate is cleaned, as shown in block 309.

The devices are completed by bonding joined substrates, applying the dual function temperature sensing and substrate heating elements, and dicing as in method 200.

Figure 16:
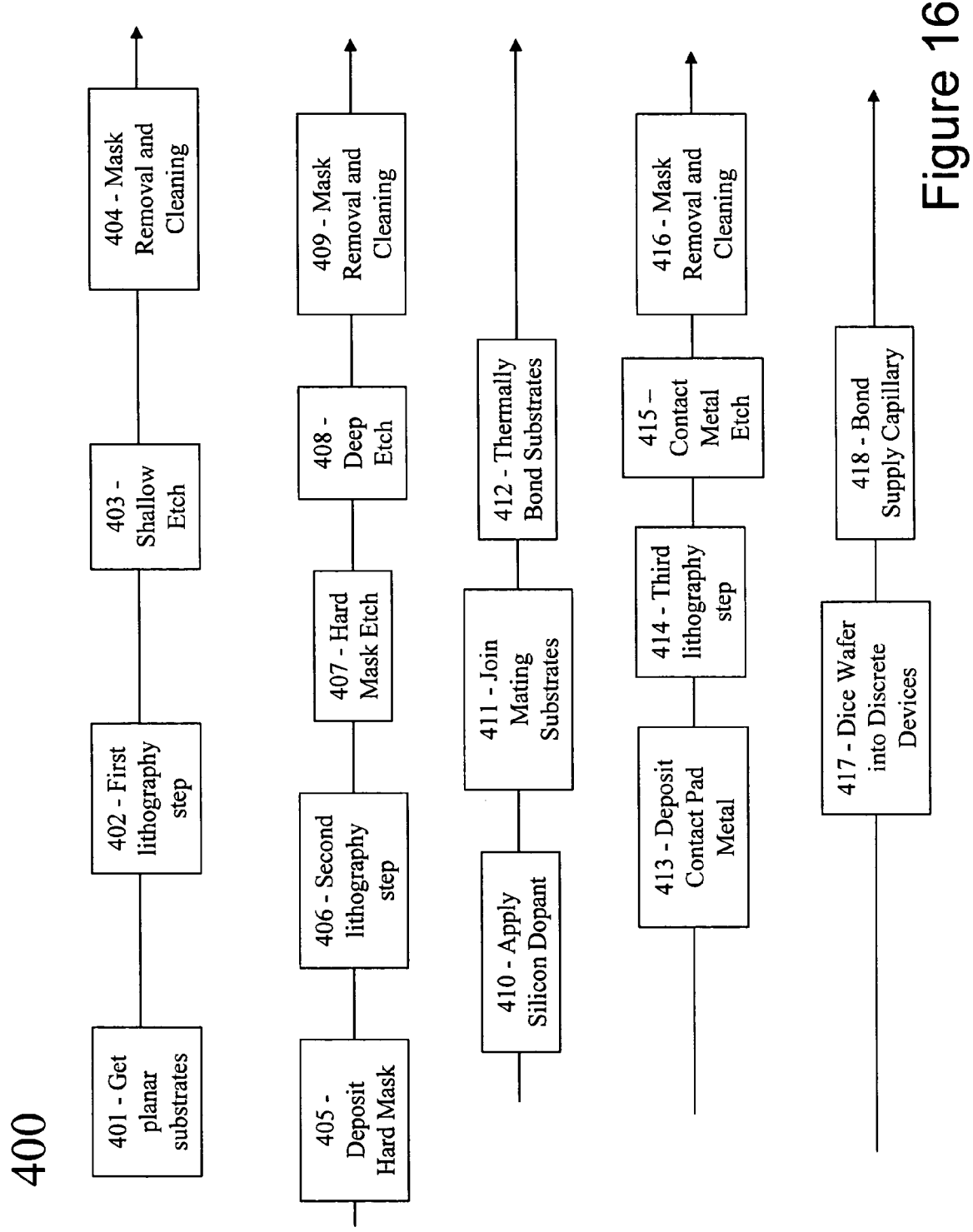
FIG. 16 is a block diagram of a method for micromachining a freeze-thaw valve, in accordance with a third exemplary embodiment.

The dual function temperature sensing and substrate heating elements are alternatively formed on silicon substrates by fabricating the devices on substrates doped to relatively high conductivity or applying dopants such as spin-on glass before the thermal wafer bonding step, step 410 shown in method 400 in FIG. 16. Metal contact pads 150 are defined lithographically as before onto the exterior of the bonded wafer assembly in alignment with the internal devices in steps 413–416.

As described above, at least a portion of the methods 200, 300, and 400 of FIGS. 14–16 may be embodied in the form of computer-implemented processes and apparatuses for practicing those processes. Additionally, at least a portion of methods 200, 300, and 400 may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may be updated to implement the invention. At least a portion of methods 200, 300, and 400 may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

While the invention has been described with reference to an exemplary embodiment, it should be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method of micro-machining a micro-fluidic valve device comprising the steps of:
   obtaining a planar substrate;
   performing at least a first lithographic process on said planar substrate such that a predetermined pattern is etched into said planar substrate, wherein said predetermined pattern includes a refrigerant inlet, expansion chamber and refrigerant outlet in fluid communication;
   disposing within said valve body at least one conduit proximate to said expansion chamber to facilitate communication of thermal properties of refrigerant to a fluid flowing through said at least one conduit to form a freeze-thaw region in said at least one conduit; and
   providing a mating structure over said refrigerant inlet, expansion chamber and refrigerant outlet.

2. The method of claim 1 further including the steps of,
   depositing a contact pad metal onto said planar substrate;
   performing a second lithographic process on said planar substrate such that said contact pad metal is formed into at least one electrically conductive element on said planar substrate; and
   forming a heating element on said planar substrate in electrical communication with said at least one electrically conductive element.

3. The method of claim 1, wherein at least a portion of said planar substrate is material selected from the group consisting of silicon, glass, ceramic, silver and copper.

4. The method of claim 1, wherein disposing within said valve body at least one conduit comprises including in said predetermined pattern said at least one conduit, wherein said at least one conduit has a conduit inlet and a conduit outlet.

5. The method of claim 1, wherein said predetermined pattern further includes at least one serpentine portion in fluid communication with said expansion chamber.

6. The method of claim 1, wherein said predetermined pattern further includes an expansion chamber containing a restriction region, wherein said restriction region includes a flow restriction.

7. The method of claim 1, wherein said predetermined pattern is formed using a hard mask material and said hard mask material is a silicon nitride material having an approximate thickness of 0.5 microns.

8. The method of claim 1, wherein said predetermined pattern is formed using a hard mask material and said hard mask material is an aluminum material having an approximate thickness of 0.25 microns.

9. The method of claim 1, wherein said at least one lithographic process includes at least one of a wet etch process and a Bosch etch process.

10. A freeze-thaw valve comprising:
a valve housing defining a housing cavity and including at least one housing inlet, at least one housing vent, at least one housing fluid conduit inlet and at least one housing fluid conduit outlet;
a substrate;
a valve body, at least a portion of which is lithographically etched into said substrate, said valve body including a refrigerant inlet, a refrigerant outlet and an expansion chamber, said expansion chamber being disposed to provide fluid communication between said refrigerant inlet and said refrigerant outlet; and
at least one conduit disposed within said valve body and having a conduit inlet and a conduit outlet, said at least one conduit disposed proximate to said expansion chamber to facilitate communication of thermal properties of said refrigerant to a fluid flowing through said at least one conduit to form a freeze-thaw region in said at least one conduit.

11. The freeze-thaw valve according to claim 10, wherein said valve housing includes at least one mounting structure disposed within said housing cavity for non-movably containing said valve body within said valve housing.

12. The freeze-thaw valve according to claim 10, wherein said valve body includes at least one electrically conductive surface and said valve body is electrically connected to external controls to induce heating of said valve body and thaw said fluid in said at least one conduit.

13. The freeze-thaw valve according to claim 12, wherein said valve body is electrically connected to external controls by a plurality of electrical spring contacts disposed in said housing and engaging said at least one electrically conductive surface on said valve body.

14. The freeze-thaw valve according to claim 13, wherein said plurality of electrical spring contacts disposed in said housing are connected to a wiring harness to provide electrical continuity between the valve body and said external controls via said wiring harness.

15. The freeze-thaw valve according to claim 10, wherein said valve body is disposed within said housing cavity to form a thermally insulating void between said valve housing and said valve body.

16. The freeze-thaw valve according to claim 10, further including a porous element disposed proximate to said refrigerant outlet.

17. The freeze-thaw valve according to claim 10, wherein said at least one conduit includes at least one capillary tube disposed within said at least one conduit and said at least one capillary tube traverses said at least one conduit such that said at least one capillary tube extends from said conduit inlet and said conduit outlet.

18. The freeze-thaw valve according to claim 10, further including a supply capillary tube and wherein said supply capillary tube is bonded in said refrigerant inlet of said valve body to form a refrigerant tubing conduit.

19. The freeze-thaw valve according to claim 18, wherein said refrigerant tubing conduit is of a smaller inner diameter than said expansion chamber.

20. The freeze-thaw valve according to claim 10, wherein said valve body further includes a flow restriction region between said expansion chamber and said refrigerant outlet.

21. The freeze-thaw valve according to claim 20, wherein said flow restriction region includes said refrigerant tubing conduit.

22. The freeze-thaw valve according to claim 20, wherein said flow restriction region includes an orifice fabricated upstream and proximate to said expansion chamber, and said orifice creates a restriction that causes a localized pressure drop in said refrigerant as it passes into said expansion chamber.

23. The freeze-thaw valve according to claim 10, wherein said valve body further includes at least one serpentine portion in fluid communication with said refrigerant inlet and said refrigerant outlet.

24. The freeze-thaw valve according to claim 10, wherein said valve body further includes a plurality of substantially parallel channels in fluid communication with said expansion chamber and said refrigerant outlet.

25. The freeze-thaw valve according to claim 10, further including a refrigerant vent channel, said refrigerant vent channel communicating said expansion chamber with said refrigerant outlet.

26. The freeze-thaw valve according to claim 11, wherein said valve body is non-movably disposed within said housing cavity using an adhesive.

27. The freeze-thaw valve according to claim 10, wherein said valve body is formed of material selected from the group consisting of silicon, glass, ceramic, silver and copper.

28. The freeze-thaw valve according to claim 12, wherein said at least one electrically conductive surface on said valve body is used to sense electrical resistance change of said valve body sense temperature of said valve body.

29. The freeze-thaw valve according to claim 28, wherein said electrical resistance change of said valve body is used for feedback control of application of heater or refrigerant to said valve body.

* * * * *